United States Patent
Oh et al.

(10) Patent No.: US 8,588,709 B2
(45) Date of Patent: Nov. 19, 2013

(54) SWITCHING APPARATUS AND METHOD FOR WIRELESS COMMUNICATION SYSTEM

(75) Inventors: Jong-Ee Oh, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 282 days.

(21) Appl. No.: 12/971,548

(22) Filed: Dec. 17, 2010

(65) Prior Publication Data
US 2011/0150054 A1 Jun. 23, 2011

(30) Foreign Application Priority Data

Dec. 18, 2009 (KR) .......................... 10-2009-0127303
Apr. 20, 2010 (KR) .......................... 10-2010-0036200

(51) Int. Cl.
*H04B 1/44* (2006.01)

(52) U.S. Cl.
USPC ............. 455/78; 455/132; 455/455; 455/272; 455/575.7; 370/252; 370/280; 333/101

(58) Field of Classification Search
USPC ............ 455/132, 455, 101, 272, 78; 370/252, 370/280; 333/101
See application file for complete search history.

(56) References Cited

U.S. PATENT DOCUMENTS

| | | | |
|---|---|---|---|
| 2003/0076787 A1* | 4/2003 | Katz et al. ..................... | 370/252 |
| 2007/0243839 A1* | 10/2007 | Kostic ........................... | 455/132 |
| 2009/0156227 A1* | 6/2009 | Frerking et al. .............. | 455/455 |
| 2010/0225414 A1* | 9/2010 | Gorbachov .................... | 333/101 |
| 2010/0226291 A1* | 9/2010 | Gorbachov .................... | 370/280 |
| 2010/0226292 A1* | 9/2010 | Gorbachov .................... | 370/280 |

FOREIGN PATENT DOCUMENTS

| | | |
|---|---|---|
| KR | 10-2008-0031552 A | 4/2008 |
| KR | 10-2008-0072164 A | 8/2008 |
| KR | 10-2009-0082190 A | 7/2009 |

* cited by examiner

*Primary Examiner* — April G Gonzales
(74) *Attorney, Agent, or Firm* — Kile Park Reed & Houtteman PLLC

(57) ABSTRACT

A switching apparatus in a wireless communication system using multi-channels includes: a first antenna unit configured to transmit and receive data of a first multi-channel among the multi-channels; a second antenna unit configured to transmit and receive data of a second multi-channel among the multi-channels; a first transceiver configured to receive the data from the first antenna unit and transmit the data to the first transceiver; and a selection unit configured to transmit an output of the second antenna unit to the first transceiver.

10 Claims, 8 Drawing Sheets

SWITCHING APPARATUS AND METHOD FOR WIRELESS COMMUNICATION SYSTEM

CROSS-REFERENCES TO RELATED APPLICATIONS

The present application claims priority of Korean Patent Application Nos. 10-2009-0127303 and 10-2010-0036200, filed on Dec. 18, 2009, and Apr. 20, 2010, respectively, which are incorporated herein by reference in their entirety.

BACKGROUND OF THE INVENTION

1. Field of the Invention

Exemplary embodiments of the present invention relate to a switching apparatus and method of an RF module and a multi-input multi-output (MIMO) transceiver in a wireless communication system; and, more particularly, to a switching apparatus and method of an RF channel module according to change in the number of antennas used in each channel of a wireless communication system using multi-channels, and a switching apparatus and method of a MIMO transceiver therein.

2. Description of Related Art

In general, a wireless communication system uses a single continuous band. As a representative method for increasing the throughput of a wireless communication system, there are a method which increases a bandwidth and a MIMO method which increases the number of antennas and transmits and receives signals therethrough. However, when it is difficult to continuously increase a bandwidth, there is a need for a method which discontinuously increases a bandwidth by simultaneously using a single bandwidth and another bandwidth spaced apart therefrom.

The bandwidth can be continuously increased by fixing the number of RF communication modules and increasing only a channel bandwidth supported in each RF communication module. On the other hand, the bandwidth can be discontinuously increased by separately implementing RF communication modules for each bandwidth because a plurality of bandwidths may be spaced relatively far apart.

In order to support the MIMO scheme to the discontinuous multi-channels, a plurality of RF communication modules are implemented in each multi-channel. For example, a total of sixteen RF communication modules are implemented in order to support two multi-channels and support eight antennas to each channel. However, the RF communication module occupies a significant portion (¼ to ⅓) of a board area, which increases a manufacturing cost and causes a serious system power supply problem. To solve these problems, there is a need for an RF channel module (including an antenna, an RF processing module, a clock, an analog/digital (A/D) converter, and a digital/analog (D/A) converter) which has a smaller size and higher convergence in order to reduce a board area of a single RF chain.

However, the size of the existing RF channel module is high in the completion degree of development and there is beyond the improvement thereof. Also, even though the board area of the single RF channel is reduced by the system convergence, the reduced margin width is insufficient in relation to the expansion of the spatial size caused by several times increase in the number of the RF channels.

Also, the complexity of the MIMO transceiver has high dependency on the number of streams supported in the wireless communication system. In order to simultaneously transceiver a lot of streams, a more complex MIMO transceiver is required. As in the above example, in order to support two multi-channels and support eight antennas to each channel, two MIMO transceiver processors supporting eight-antenna processing are required.

Also, there is a technique which shares RF channel modules when a single terminal supports a plurality of protocols. For example, when a single terminal supports three communication protocols, such as a Bluetooth protocol, a wireless LAN protocol, and a cellular protocol, an integrated switching module is constructed such that RF channel modules are shared through switching, a baseband is implemented according to each protocol, and a communication is performed without overlapping of the independent protocols. Such a method can support a MIMO scheme by switching the RF channel modules according to situations because it is most likely for a single terminal to use a single communication protocol and it is least likely for a single terminal to simultaneously use a plurality of communication protocols.

However, since the characteristics of the RF channel modules may be changed between heterogeneous devices, the RF channel module must be designed to support a plurality of physical characteristics. Also, in order to simultaneously support independently operating protocols, it may be very difficult to logically design an integrated switching module. Furthermore, such a method must share only the RF channel modules by switching, and baseband hardware must be independently used.

SUMMARY OF THE INVENTION

An embodiment of the present invention is directed to a switching apparatus and method which can increase bandwidth efficiency.

Another embodiment of the present invention is directed to a flexible switching apparatus and method.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a switching apparatus in a wireless communication system using multi-channels includes: a first antenna unit configured to transmit and receive data of a first multi-channel among the multi-channels; a second antenna unit configured to transmit and receive data of a second multi-channel among the multi-channels; a first transceiver configured to receive the data from the first antenna unit and transmit the data to the first transceiver; and a selection unit configured to transmit an output of the second antenna unit to the first transceiver.

In accordance with another embodiment of the present invention, a switching method in a wireless communication system using multi-channels includes: transmitting and receiving data of a first multi-channel among the multi-channels; transmitting and receiving data of a second multi-channel among the multi-channels; receiving the data transmitted from the first multi-channel and transmitting the data to the first multi-channel; and transferring the data transmitted from the second multi-channel to the first multi-channel.

DESCRIPTION OF SPECIFIC EMBODIMENTS

Figure 1:
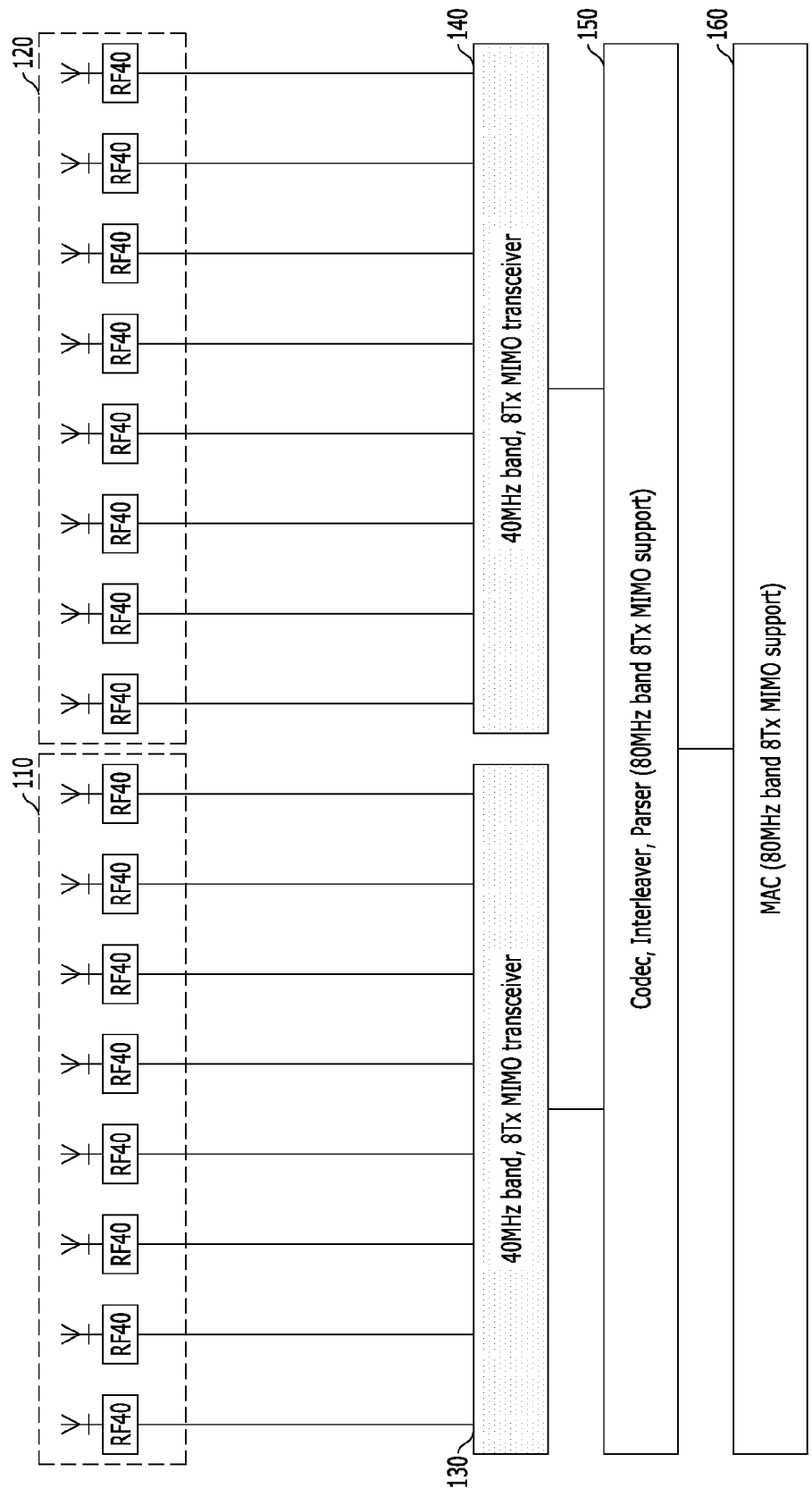
FIG. 1 is a block diagram illustrating a case of supporting a MIMO scheme in which an RF channel module has a 40-MHz band and each multi-channel uses eight antennas.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a case of supporting a MIMO scheme in which an RF channel module has a 40-MHz band and each multi-channel uses eight antennas.

Referring to FIG. 1, a switching apparatus includes a medium access control (MAC) 160 configured to support a MIMO using multi-channels, a channel codec/interleaver/parser 150, a first transceiver 130 for multi-channels, a second transceiver 140 for multi-channels, a first antenna unit 110 including eight antennas managed by the first transceiver 130, and a second antenna unit 120 including eight antennas managed by the second transceiver 140.

FIG. 1 illustrates an example in which the wireless communication system using a total 80-MHz bandwidth includes two 40-MHz multi-channels and each multi-channel uses eight antennas. In FIG. 1, the RF channel module supports sixteen 40-MHz bandwidths, and the first and second transceivers 130 and 140 support the MIMO scheme by using the first antenna unit 110 and the second antenna unit 120 each having eight antennas in each multi-channel. Also, the channel codec/interleaver/parser 150 and the MAC 160 are related to only the total bandwidth and the number of antennas, regardless of the construction of the multi-channels. Thus, two multi-channels can be integrally managed.

Figure 2:
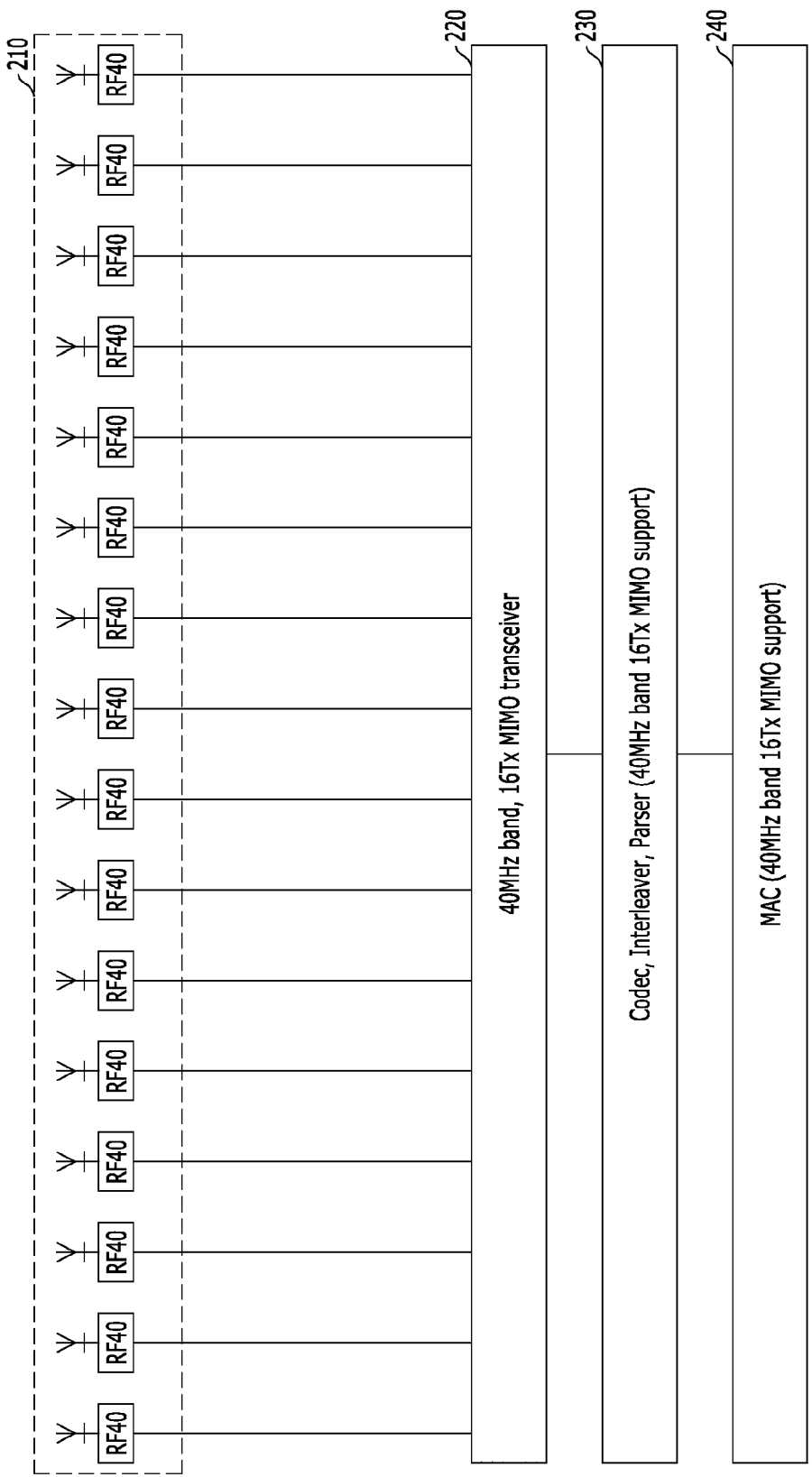
FIG. 2 is a block diagram illustrating a case of supporting a MIMO scheme in which an RF channel module has a 40-MHz band and uses sixteen antennas.

FIG. 2 is a block diagram illustrating a case of supporting a MIMO scheme in which an RF channel module has a 40-MHz band and uses sixteen antennas.

In FIG. 2, the number of the RF channel modules is equal to that of FIG. 1, but the multi-channels are not used. Referring to FIG. 2, a switching apparatus includes an antenna unit 210, a transceiver 220, a channel codec/interleaver/parser 230, and a MAC 240.

In FIG. 2, the wireless communication system using a total 40-MHz bandwidth supports a MIMO scheme using sixteen antennas. In FIG. 2, although the same number of the RF channel modules as that of FIG. 1 is used, but the transceiver 220 supports the MIMO scheme using sixteen antennas. Compared with the MIMO transceiver supporting eight antennas, the MIMO transceiver supporting sixteen antennas is disadvantageous in that its complexity is higher, but is advantageous in that its frequency efficiency is further increased. Compared with the architecture of FIG. 1, the channel codec/interleaver/parser 230 and the MAC 240 have the same total transmission rate, and thus, the complexity and implementation difficulty thereof are similar. Therefore, the specification may be defined to support the MIMO system with the almost same hardware. That is, in view of the channel codec and the MAC, there is no difference between the transmission of data to an antenna domain and the transmission of data to a frequency domain. A total quantity of transmitted data is important.

Figure 3:
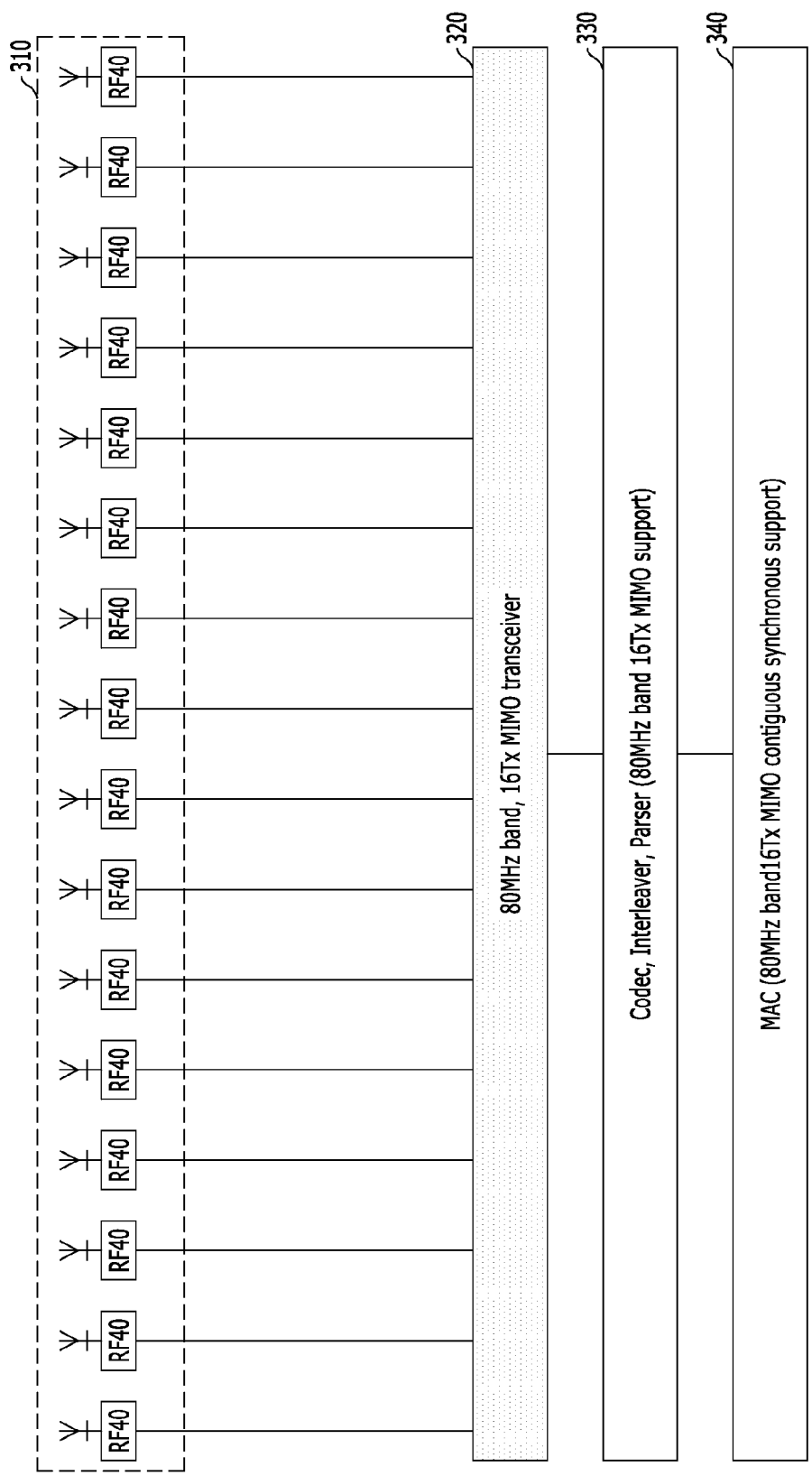
FIG. 3 is a block diagram illustrating a case of supporting a MIMO scheme in which an RF channel module has an 80-MHz band and uses sixteen antennas.

FIG. 3 is a block diagram illustrating a case of supporting a MIMO scheme in which an RF channel module has an 80-MHz band and uses sixteen antennas.

FIG. 3 illustrates a case in which a wireless communication system continuously using a total 80-MHz bandwidth supports a MIMO scheme by using sixteen antennas. The number of the RF channel modules is 16, which is equal to that of FIG. 2, but each RF channel module is implemented to support 80 MHz. Since the MIMO transceiver supporting sixteen antennas is used, a frequency efficiency thereof is equal to that of FIG. 2. However, since the bandwidth of FIG. 3 is two times the bandwidth of FIG. 2, the quantity of transmittable data is two times. Thus, the channel codec and the interleaver must be implemented to have two times the complexity of FIG. 2.

Various types of the conventional schemes having sixteen RF channel modules have been described with reference to FIGS. 1 to 3. The scheme of FIG. 1 uses an 80-MHz bandwidth and is advantageous in that a MIMO transceiver has a relatively lower complexity than that of FIG. 2, but its frequency efficiency is lower than that of FIG. 2. The scheme of FIG. 3 uses an 80-MHz bandwidth and has high frequency efficiency, but is disadvantageous in that the 80-MHz bandwidth is supported only in a continuous manner and the channel codec and the interleaver must be implemented to have two times complexity.

Hereinafter, in a wireless communication system using multi-channels, several situations in which an AP simultaneously communicates with a plurality of terminals will be described in order to clarify the efficiency of the present invention. It will be assumed that the multi-channels include two channels, that is, a multi-channel 1 and a multi-channel 2.

A first case: The multi-channel 1 communicates with a complex terminal which uses a large number of antennas and has high frequency efficiency, and the multi-channel 2 communicates a simple terminal using a small number of antennas.

A second case: The multi-channel 1 supports a multi-user (MU)-MIMO scheme in an access point (AP) and communicates with a plurality of terminals, and the multi-channel 2 communicates with a terminal supporting a single-user (SU)-MIMO scheme or a terminal supporting a single input single output (SISO) scheme.

A third case: The multi-channel 1 and the multi-channel 2 communicate with terminals supporting the MU-MIMO scheme, a plurality of users access and communicate with the multi-channel 1, and a small number of users access and communicate with the multi-channel 2.

In a case that communicates with a terminal supporting a simple MIMO scheme, or communicates with a terminal supporting only a SISO scheme, or communicates in an MU-MIMO scheme in which a small number of users are accessed, that is, a single multi-band less requires a use frequency and a frequency resource than the others, RF channel modules of the multi-channels used may be more than required. On the other hand, in a case that communicates with a complex terminal or communicates in a plurality of MU-MIMO schemes, RF channel modules of the multi-channels used may be less than required. In the existing method, the number of the RF channel modules of each multi-channel, the channel codec and the interleaver is increased to the maximum. However, such a method much increases the complexity and, in some cases, resources are left unused, thus increasing inefficiency.

Therefore, the embodiment of the present invention proposes a scheme which can support various MIMO schemes in each multi-channel by using a smaller number of RF channel modules and a channel codec and an interleaver having a lower complexity, as compared to an existing scheme. Hereinafter, embodiments of the present invention will be described.

Figure 4:
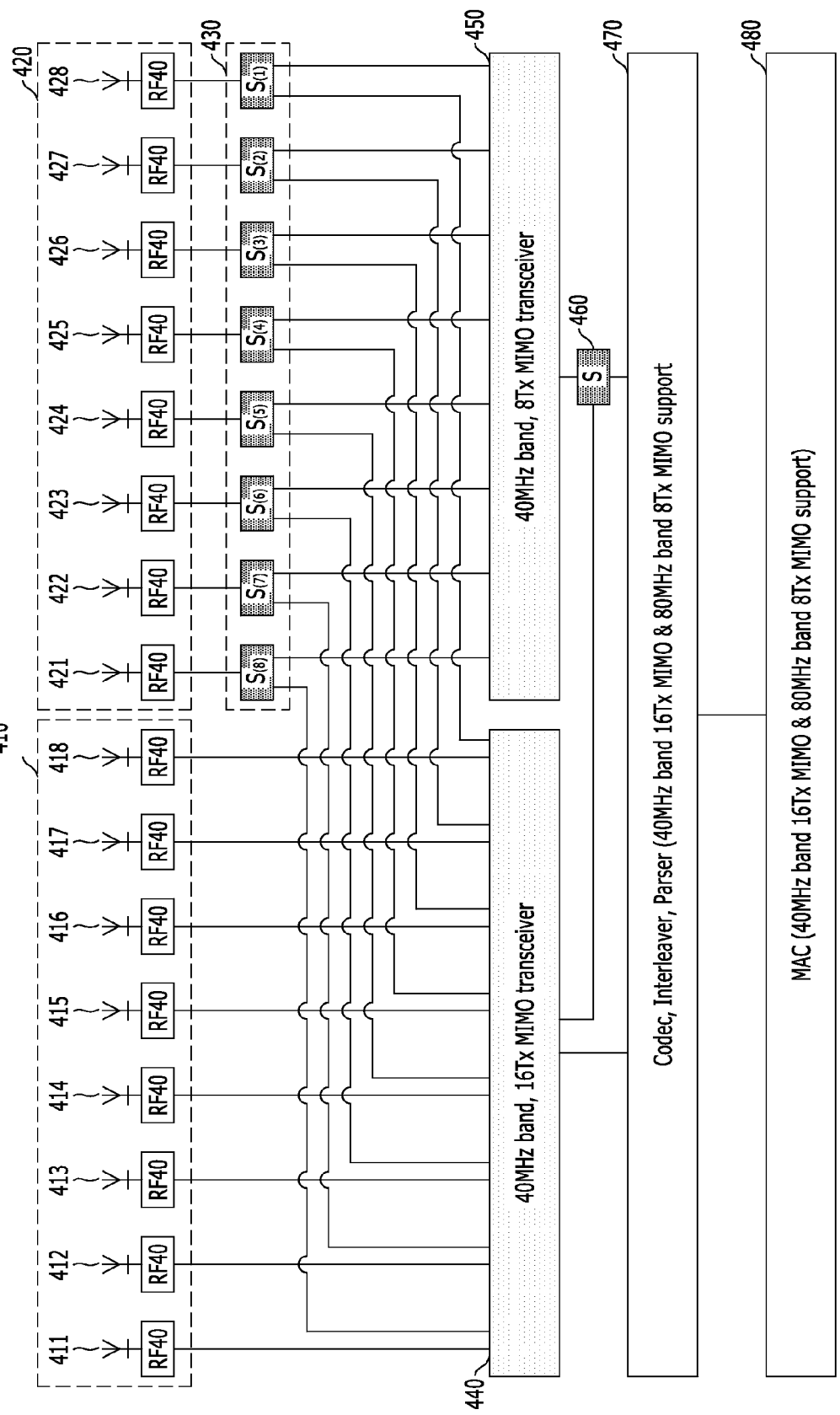
FIG. 4 is a block diagram illustrating an embodiment of the present invention in which an RF channel module has a 40-MHz band and supports two multi-channels.

FIG. 4 is a block diagram illustrating an embodiment of the present invention in which an RF channel module has a 40-MHz band and supports two multi-channels.

Referring to FIG. 4, a switching apparatus includes a MAC 480 configured to provide multi-channels, a channel codec/interleaver/parser 470, a first transceiver 440 having a 40-MHz bandwidth and having sixteen transmit antennas, a second transceiver 450 having a 40-MHz bandwidth and having eight transit antennas, a transceiver selection unit 460 configured to selectively transmit outputs of the first transceiver 440 and the second transceiver 450 to the channel codec/interleaver/parser 470, a first antenna unit 410 belonging to the first transceiver 440, a second antenna unit 420 selectively used in the first transceiver 440 and the second transceiver 450, and an antenna selection unit 430 configured to select one of antennas of the second antenna unit 420 to connect the selected antenna to one of the first transceiver 440 and the second transceiver 450. Hereinafter, the first antenna unit 410 and the first transceiver 440 are referred to as a multi-channel 1, and the second antenna unit 420 and the second transceiver 450 are referred to as a multi-channel 2.

In FIG. 4, two multi-channels are supported by using sixteen RF channel modules having a 40-MHz bandwidth. If the number of antennas used in each multi-channel is expressed as (the number of multi-channel 1 antennas, the number of multi-channel 2 antennas), constructions such as (16, 0), (15, 1), . . . , (9, 7), (8, 8), (7, 9), . . . , (1, 15), (0, 16) are possible. That is, since the antenna of a single multi-channel can be selectively constructed with one of the two multi-channels, a single multi-channel can transmit and receive data by using maximally sixteen antennas and minimally zero antenna.

FIG. 4 illustrates an example in which the first transceiver 440 supporting 16Tx MIMO or the second transceiver 450 supporting 8Tx MIMO can be connected by using the selection unit connected to each antenna of the second antenna unit 420 belonging to the multi-channel 2. Also, the output of the first transceiver 440 and the output of the second transceiver 450 are selectively inputted to the channel codec/interleaver/parser 470 by using the transceiver selection unit 460. As described above with reference to FIG. 2, the channel codec/interleaver/parser 470 and the MAC 480 are implemented to support both the scheme having a 40-MHz bandwidth and using sixteen antennas and the scheme having an 80-MHz bandwidth and eight antennas.

As described above, since the total transmission rate is equal, the complexity and implementation difficulty are similar. Thus, the almost same hardware may be supported. Also, since the architecture of FIG. 4 has the same maximum data transmission amount, the channel codec, the interleaver, the parser, and the MAC may be designed to have similar complexity.

Figure 5:
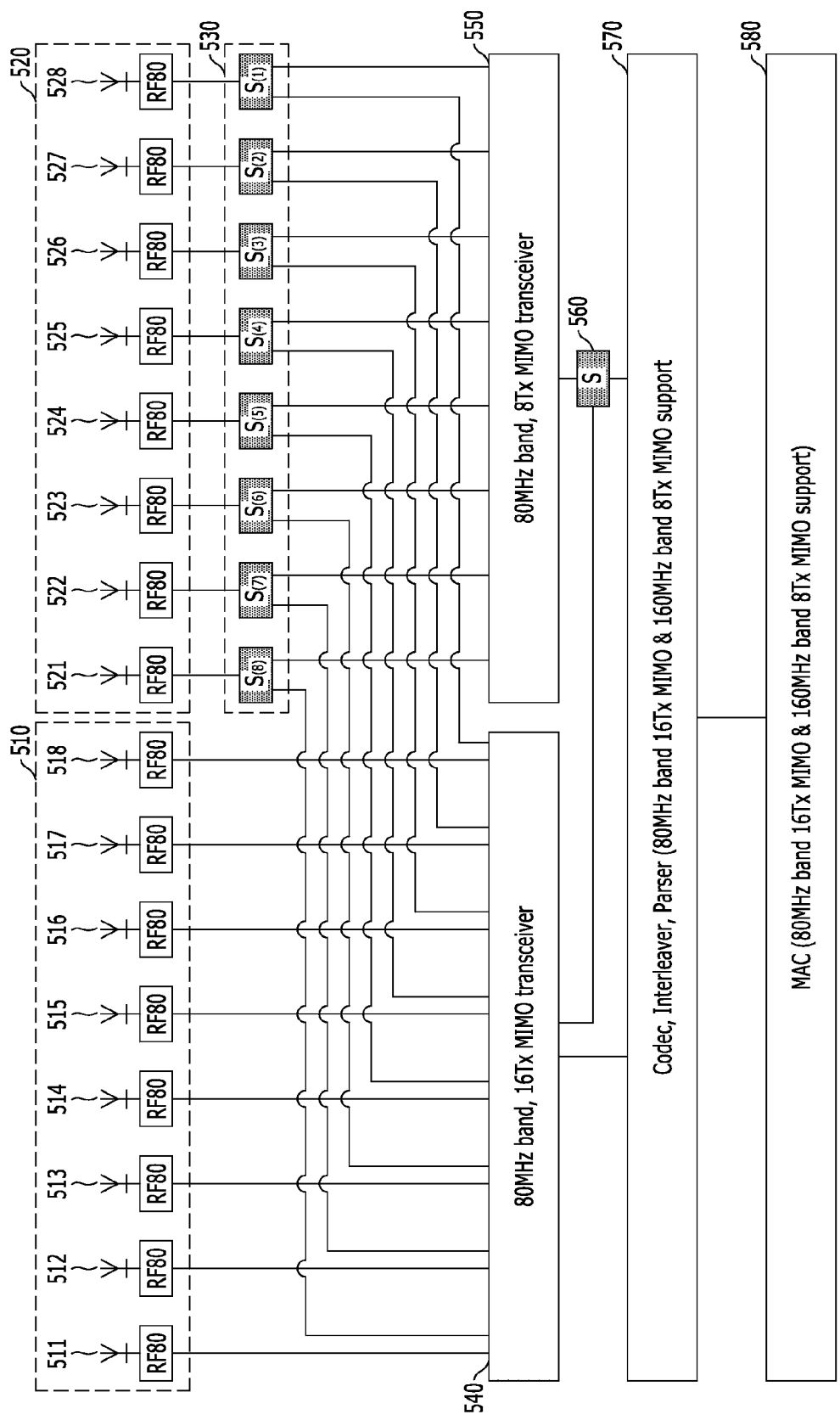
FIG. 5 is a block diagram illustrating an embodiment of the present invention in which an RF channel module has an 80-MHz band and supports two multi-channels.

FIG. 5 is a block diagram illustrating an embodiment of the present invention in which an RF channel module has an 80-MHz band and supports two multi-channels.

The bandwidth supported by the first transceiver 540 and the second transceiver 550 and the bandwidth of the channel codec/interleaver/parser 570 in FIG. 5 are different from those in FIG. 4, but the other architecture of FIG. 5 is identical to that of FIG. 4. Hereinafter, the first antenna unit 510 and the first transceiver 540 are referred to as a multi-channel 1, and the second antenna unit 520 and the second transceiver 550 are referred to as a multi-channel 2.

In FIG. 5, two multi-channels are supported by using sixteen RF channel modules having a 40-MHz bandwidth, which is identical to the scheme of FIG. 4. If the number of antennas used in each multi-channel is expressed as (the number of multi-channel 1 antennas, the number of multi-channel 2 antennas), constructions such as (16, 0), (15, 1), . . . , (9, 7), (8, 8), (7, 9), . . . , (1, 15), (0, 16) are possible. That is, since the antenna of a single multi-channel can be selectively constructed with one of the two multi-channels, a single multi-channel can transmit and receive data by using maximally sixteen antennas and minimally zero antenna.

FIG. 5 illustrates an example in which the first transceiver 540 supporting 16Tx MIMO or the second transceiver 550 supporting 8Tx MIMO can be connected by using the selection unit connected to each antenna of the second antenna unit 520 belonging to the multi-channel 2. Also, the output of the first transceiver 540 and the output of the second transceiver 550 are selectively inputted to the channel codec/interleaver/parser 570 by using the transceiver selection unit 560. In FIG. 5, a 16Tx MIMO scheme can be supported in a continuous 80-MHz band.

Figure 6:
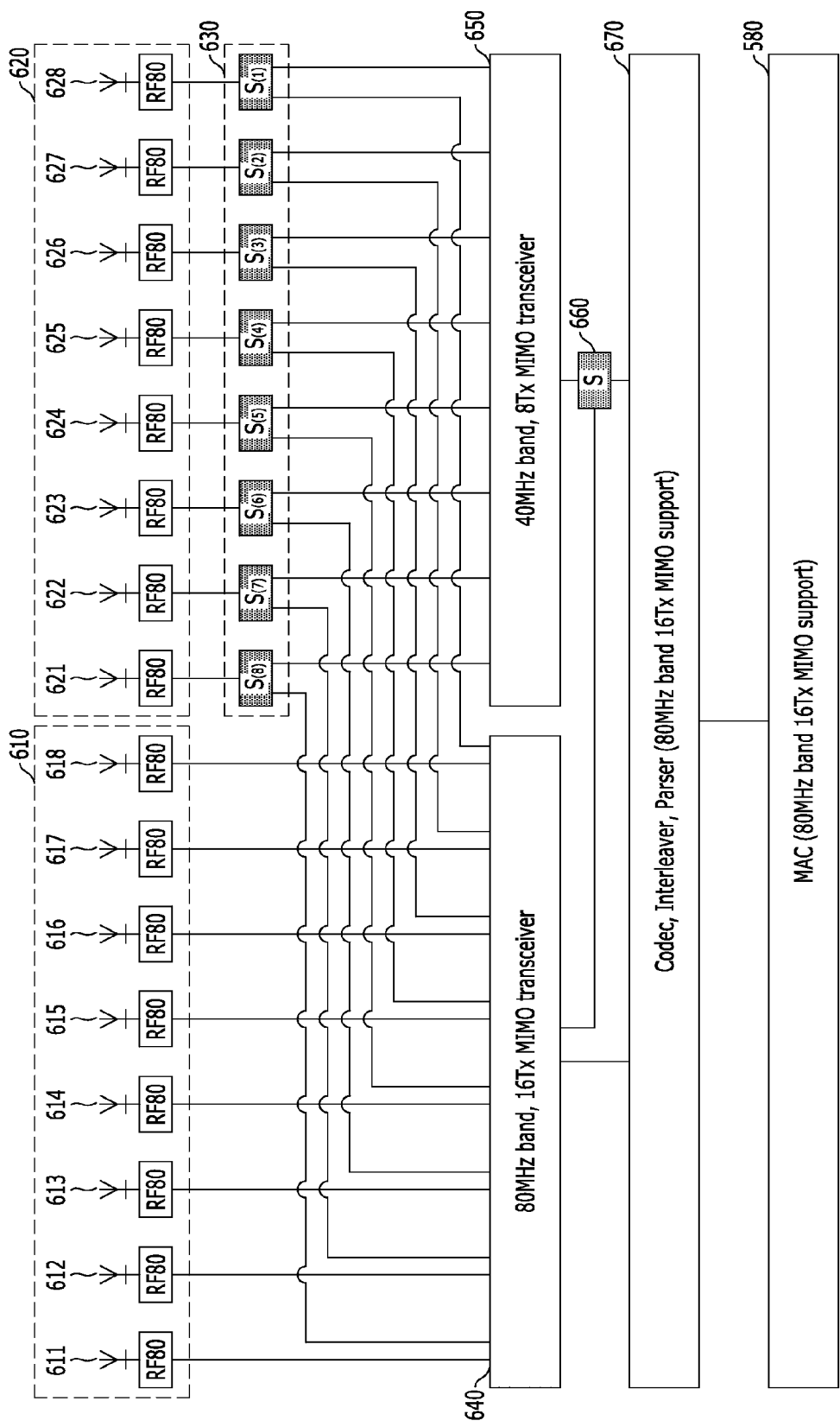
FIG. 6 is a block diagram illustrating an embodiment of the present invention in which an RF channel module has an 80-MHz band and supports up to 80-MHz continuous single channel and discontinuous multi-channels.

FIG. 6 is a block diagram illustrating an embodiment of the present invention in which an RF channel module has an 80-MHz band and supports up to 80-MHz continuous single channel and discontinuous multi-channels.

The architecture of FIG. 6 is identical to those of FIGS. 4 and 5. The bandwidth supported by a first transceiver 640 and a second transceiver 650 and the bandwidth of a channel codec/interleaver/parser 670 in FIG. 6 are different from those in FIGS. 4 and 5. That is, in the wireless communication system, the maximally 80-MHz continuous single channel and discontinuous multi-channel can be supported. Also, the bandwidths of the multi-channels may be different.

Figure 7:
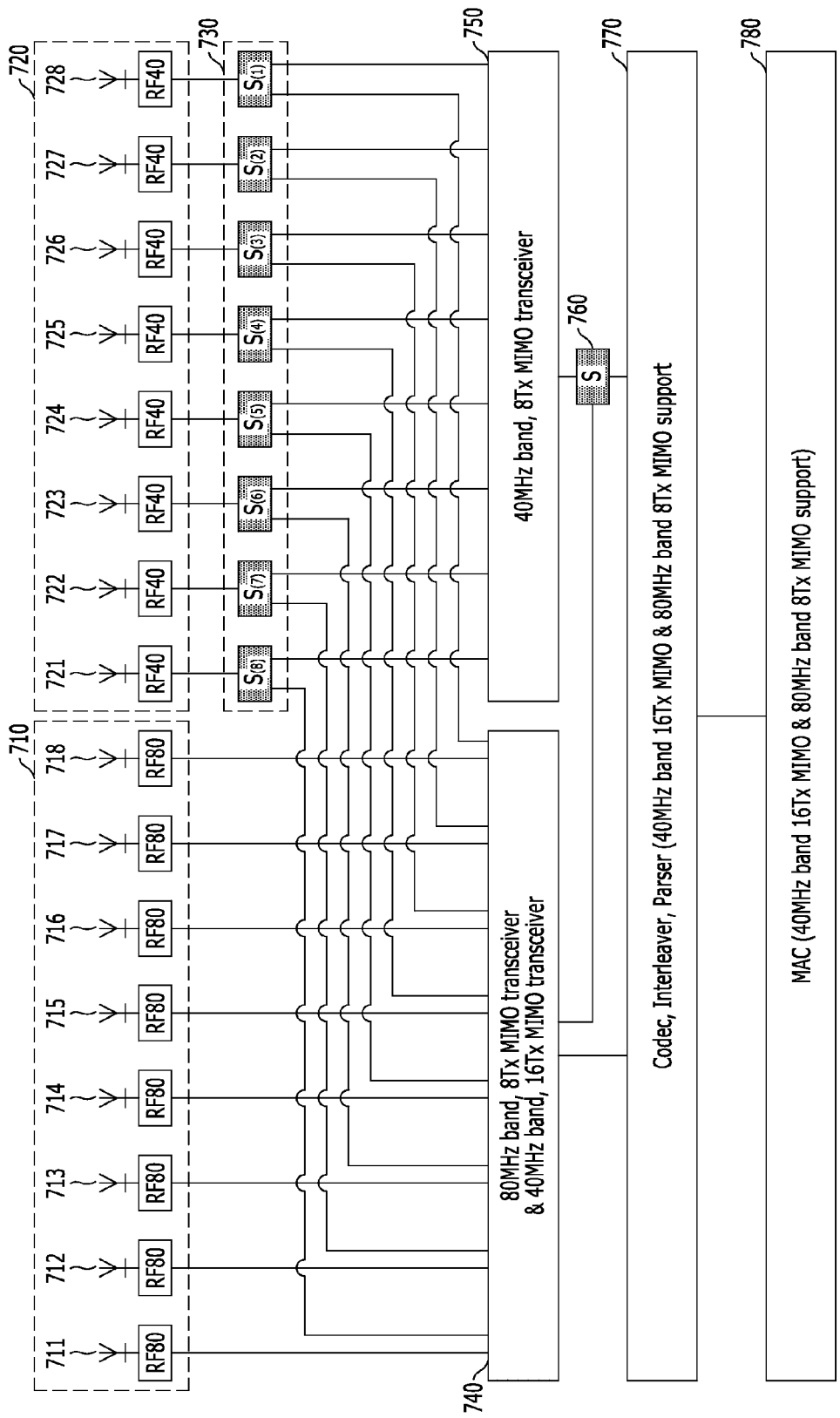
FIG. 7 is a block diagram illustrating an embodiment of the present invention in which eight RF channel modules have an 80-MHz band, eight RF channel modules have a 40-MHz band, and the RF channel modules support up to 80-MHz continuous single channel and discontinuous multi-channels.

FIG. 7 is a block diagram illustrating an embodiment of the present invention in which eight RF channel modules have an 80-MHz band, eight RF channel modules have a 40-MHz band, and the RF channel modules support up to 80-MHz continuous single channel and discontinuous multi-channels.

The architecture of FIG. 7 is identical to those of FIGS. 4 and 5. The bandwidth supported by a first transceiver 740 and a second transceiver 750 and the bandwidth of a channel codec/interleaver/parser 770 in FIG. 7 are different from those in FIGS. 4 and 5. In the wireless communication system, eight antennas can be supported in the maximally 80-MHz continuous single channel and discontinuous multi-channel. Also, when only the 40-MHz single channel is supported, sixteen antennas can be supported.

The embodiment of the present invention can be expanded in a similar manner by increasing or decreasing the number of the RF channel modules.

Figure 8A:
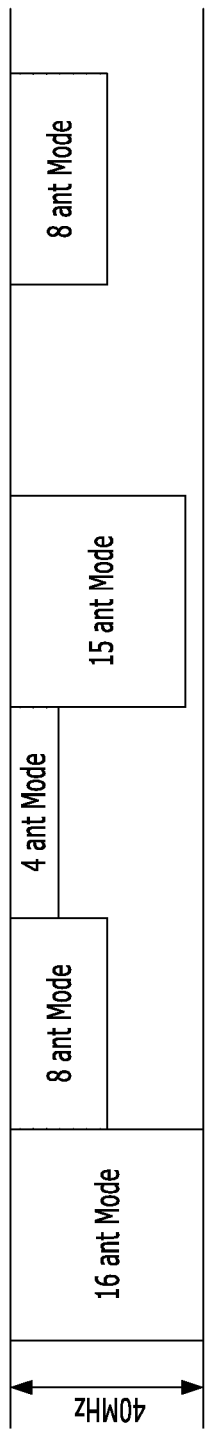
FIGS. 8A and 8B is a block diagram illustrating an operation in accordance with an embodiment of the present invention in which an RF channel module has a 40-MHz band and supports two multi-channels.
Figure 8B:
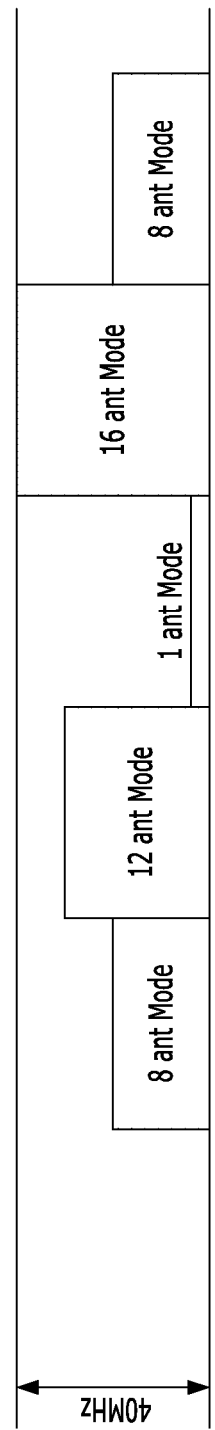

FIGS. 8A and 8B are block diagrams illustrating an operation when the scheme in accordance with the embodiment of the present invention is applied to the multi-channels. The architecture in accordance with the embodiment of the present invention is most efficiently modified according to time, considering the number of the terminals connected to each multi-channel, various modes of the terminals, and channel environments of the terminals. In this manner, the efficiency of the wireless communication system can be maximized by making the most of the given resources through the operation optimized to the situations of the multi-channels.

The switching apparatus and method in accordance with the exemplary embodiments of the present invention can increase bandwidth efficiency and have flexibility.

While the present invention has been described with respect to the specific embodiments, it will be apparent to those skilled in the art that various changes and modifications may be made without departing from the spirit and scope of the invention as defined in the following claims.

What is claimed is:

1. A switching apparatus in a wireless communication system using multi-channels, comprising:
    a first antenna unit configured to transmit and receive data of a first multi-channel among the multi-channels;
    a second antenna unit configured to transmit and receive data of a second multi-channel among the multi-channels, wherein the second antenna unit comprises a plurality of antennas;
    a first transceiver configured to receive data from the first antenna unit transmit data to the first antenna unit;
    a second transceiver configured to receive data from the second antenna unit and transmit data to the second antenna unit; and
    a selection unit comprising a plurality of selectors, wherein the plurality of selectors are respectively connected to the plurality of antennas in the second antenna unit, and
    wherein the selection unit is configured to:
        transmit, at a first time, data from one or more of the antennas in the second antenna unit to the first transceiver through respective one or more of the selectors; and
        transmit, at a second time, data from one or more of the antennas in the second antenna unit to the second transceiver through respective one or more of the selectors.

2. The switching apparatus of claim 1, wherein the first transceiver has a 40-MHz bandwidth and includes sixteen transmit antennas.

3. The switching apparatus of claim 1, wherein the second transceiver has a 40-MHz bandwidth and includes eight transmit antennas.

4. The switching apparatus of claim 1, wherein the first transceiver comprises a first transceiving unit configured to support 16Tx MIMO by using the selectors connected to the antennas of the second antenna unit.

5. The switching apparatus of claim 1, wherein the second transceiver comprises a second transceiving unit configured to support 8Tx MIMO by using the selectors connected to the antennas of the second antenna unit.

6. A switching method performed by a switching apparatus in a wireless communication system using multi-channels,
    wherein the switching apparatus comprises a first antenna unit, a second antenna unit, a first transceiver, a second transceiver, and a selection unit,
    wherein the second antenna unit comprises a plurality of antennas, wherein the selection unit comprises a plurality of selectors, and wherein the plurality of selectors are respectively connected to the plurality of antennas in the second antenna unit,
    the method comprising:
        transmitting and receiving, by the first antenna unit, data of a first multi-channel among the multi-channels;
        transmitting and receiving, by the second antenna unit, data of a second multi-channel among the multi-channels;
        receiving, by the first transceiver, data transmitted from the first antenna unit, and transmitting data to the first antenna unit;
        receiving, by the second transceiver, data transmitted from the second antenna unit, and transmitting data to the second antenna unit;
        transmitting, at a first time, data from one or more of the antennas in the second antenna unit to the first transceiver through respective one or more of the selectors; and
        transmitting, at a second time, data from one or more of the antennas in the second antenna unit to the second transceiver through respective one or more of the selectors.

7. The switching method of claim 6, wherein the first transceiver has a 40-MHz bandwidth and includes sixteen transmit antennas.

8. The switching method of claim 6, wherein the second transceiver has a 40-MHz bandwidth and includes eight transmit antennas.

9. The switching method of claim 6, wherein the first transceiver supports 16Tx MIMO by using the selectors connected to the antennas of the second antenna unit.

10. The switching method of claim 6, wherein the second transceiver supports 8Tx MIMO by using the selectors connected to the antennas of the second antenna unit.

* * * * *